United States Patent [19]

Nishikawa et al.

[11] Patent Number: 5,501,289

[45] Date of Patent: Mar. 26, 1996

[54] FLOOR STRUCTURE OF ELECTRIC VEHICLE

[75] Inventors: Masaharu Nishikawa, Hadano; Kouji Chiba, Yokohama; Tatsuo Masusaki, Nishisonogi; Atsushi Hanyu, Yokosuka, all of Japan

[73] Assignee: Nissan Motor Co., Ltd., Yokohama, Japan

[21] Appl. No.: 185,355

[22] Filed: Jan. 24, 1994

[30] Foreign Application Priority Data

Jan. 22, 1993 [JP] Japan .................. 5-008863
Mar. 10, 1993 [JP] Japan .................. 5-048485
Mar. 12, 1993 [JP] Japan .................. 5-051168

[51] Int. Cl.⁶ ............. B60R 16/04; B62D 21/12
[52] U.S. Cl. .......... 180/68.5; 180/65.1; 280/783; 280/785; 296/37.14
[58] Field of Search ............. 180/65.1, 68.5, 180/60, 311; 280/782, 783, 785, 795, 800; 296/37.14

[56] References Cited

U.S. PATENT DOCUMENTS

| | | | |
|---|---|---|---|
| 4,216,839 | 8/1980 | Gould et al. | 180/68.5 X |
| 4,339,015 | 7/1982 | Fowkes et al. | 180/68.5 X |
| 4,365,681 | 12/1982 | Singh | 180/68.5 |
| 5,378,555 | 1/1995 | Waters et al. | 180/68.5 X |
| 5,390,754 | 2/1995 | Masuyama et al. | 180/68.5 |
| 5,392,873 | 2/1995 | Masuyama et al. | 180/68.5 |

FOREIGN PATENT DOCUMENTS

| | | | |
|---|---|---|---|
| 867778 | 11/1941 | France | 180/68.5 |
| 1011256 | 6/1952 | France | 180/68.5 |
| 2640400 | 3/1977 | Germany | 180/68.5 |
| 47-31318 | 11/1972 | Japan . | |
| 59-123966 | 8/1984 | Japan . | |
| 5-208617 | 8/1993 | Japan | 180/65.1 |

*Primary Examiner*—Brian L. Johnson
*Attorney, Agent, or Firm*—Lowe, Price, LeBlanc & Becker

[57] ABSTRACT

A floor structure of an electric vehicle powered by batteries mounted thereon comprises an upper unit and a lower unit which are detachably coupled. The upper unit includes a first panel and a first base structure. The first panel is securely mounted on the first base structure in a manner to define a first given space which faces downward. The lower unit includes a second panel and a second base structure. The second base structure is securely mounted on the second panel in a manner to define a second given space which faces upward. Bolts and nuts are used for detachably coupling the upper and lower units in such a manner that the first and second given spaces are merged to constitute a united space. A grid structure is further employed which divides the united space into a plurality of container spaces. Each container space is sized to contain therein at least one of the batteries.

16 Claims, 11 Drawing Sheets

FLOOR STRUCTURE OF ELECTRIC VEHICLE

BACKGROUND OF THE INVENTION

1. Field of the Invention

The present invention relates in general to electric wheeled vehicles powered by batteries mounted thereon, and more particularly to floor structures of such electric vehicles. More specifically, the present invention is concerned with the floor structures of the electric vehicles, which are constructed to carry thereon batteries for powering the vehicles.

2. Description of the Prior Art

In electric vehicles of a type powered by batteries, the batteries are usually mounted on a floor structure of the vehicles. In order to securely mount the batteries on the floor structure, various measures have been proposed and put into practical use, some of which are shown in Japanese Patent First Provisional Publication 47-31318 and Japanese Utility Model First Provisional Publication 59-123966. In the measure of the publication 47-31318, side members, cross members and brackets, which are parts of a frame structure of the vehicle, are assembled to constitute a grid-shaped battery holding frame. The batteries are tightly disposed in the perforations of the battery holding frame respectively. While, in the measure of the publication 59-123966, many housings are defined by the floor structure for containing therein the batteries respectively. In this publication, a water jacket is also shown, which functions to keep the batteries at a given temperature.

However, the above-mentioned measures fail to consider the easiness with which the batteries are mounted to or dismounted from the vehicle. In fact, the work for mounting or dismounting the batteries onto or from the floor structure of the vehicle has been very difficult or at least troublesome because the work should be carried out within a very limited space under the vehicle floor. Furthermore, some of the conventional floor structures of such electric vehicles fail to exhibit satisfied resistance against a vehicle collision or the like.

SUMMARY OF THE INVENTION

It is therefore an object of the present invention to provide a floor structure of an electric vehicle powered by batteries mounted thereon, which is constructed to facilitate the work for mounting or dismounting of the batteries onto or from the vehicle.

It is another object of the present invention to provide a floor structure of the electric vehicle, which has a robust construction and thus has a sufficient resistance against a vehicle collision or the like.

It is still another object of the present invention to provide a measure by which the batteries on the floor structure of the electric vehicle can be kept at a given temperature.

It is a further object of the present invention to provide a measure by which the battery containers defined by the floor structure of the electric vehicle are well ventilated.

According to the present invention, there is provided a floor structure of an electric vehicle powered by batteries mounted thereon. The floor structure comprises an upper unit which includes a first panel and a first base structure, the first panel being securely mounted on the first base structure in a manner to define a first given space which faces downward; a lower unit which includes a second panel and a second base structure, the second base structure being securely mounted on the second panel in a manner to define a second given space which faces upward; first means for detachably coupling the upper and lower units in such a manner that the first and second given spaces are merged to constitute a united space; and second means for dividing the united space into a plurality of container spaces, each container space being sized to contain therein at least one of the batteries.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

As will become apparent as the description proceeds, the floor structure of the invention is constructed to carry thereon a plurality of rechargeable batteries.

Referring to FIGS. 1 to 5, there is shown a first embodiment 100 of the present invention, which is a floor structure of an electric vehicle powered by batteries mounted on the vehicle.

Figure 1:
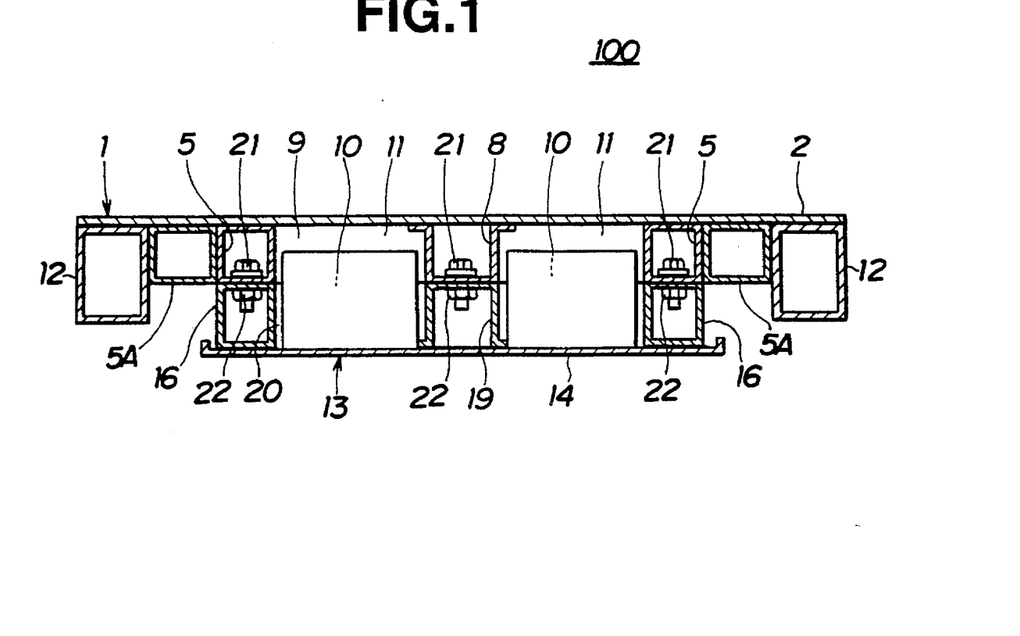
FIG. 1 is a sectional view of a floor structure which is a first embodiment of the present invention, the view being taken along the line I—I of FIG. 2.
Figure 2:
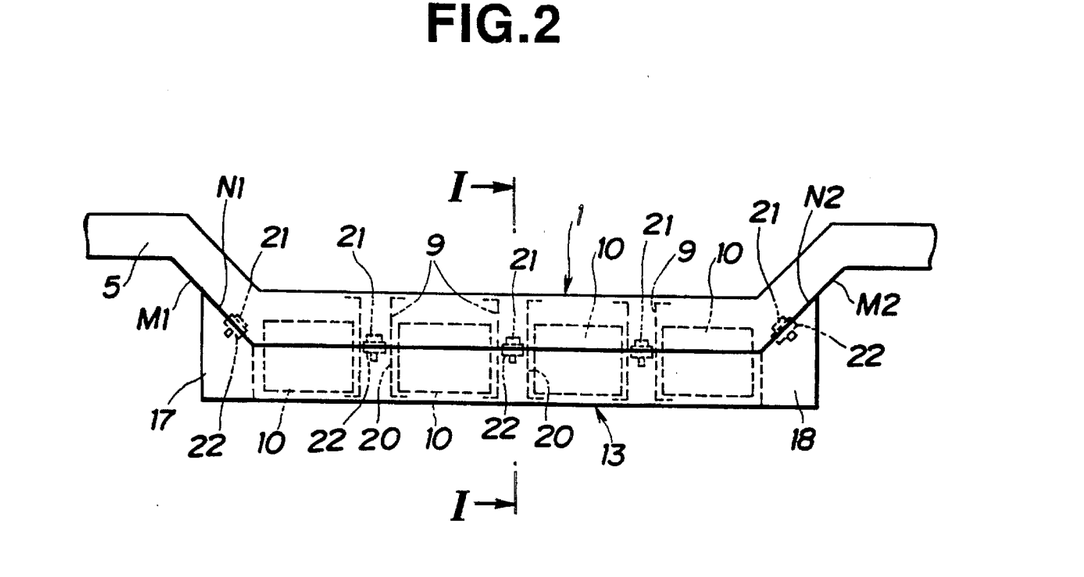
FIG. 2 is a side view of an essential portion of the floor structure of the first embodiment.

As is seen from FIGS. 1 and 2, the floor structure 100 of the first embodiment comprises generally an upper unit 1 and a lower unit 13 which are united to constitute a so-called double floor structure.

Figure 3:
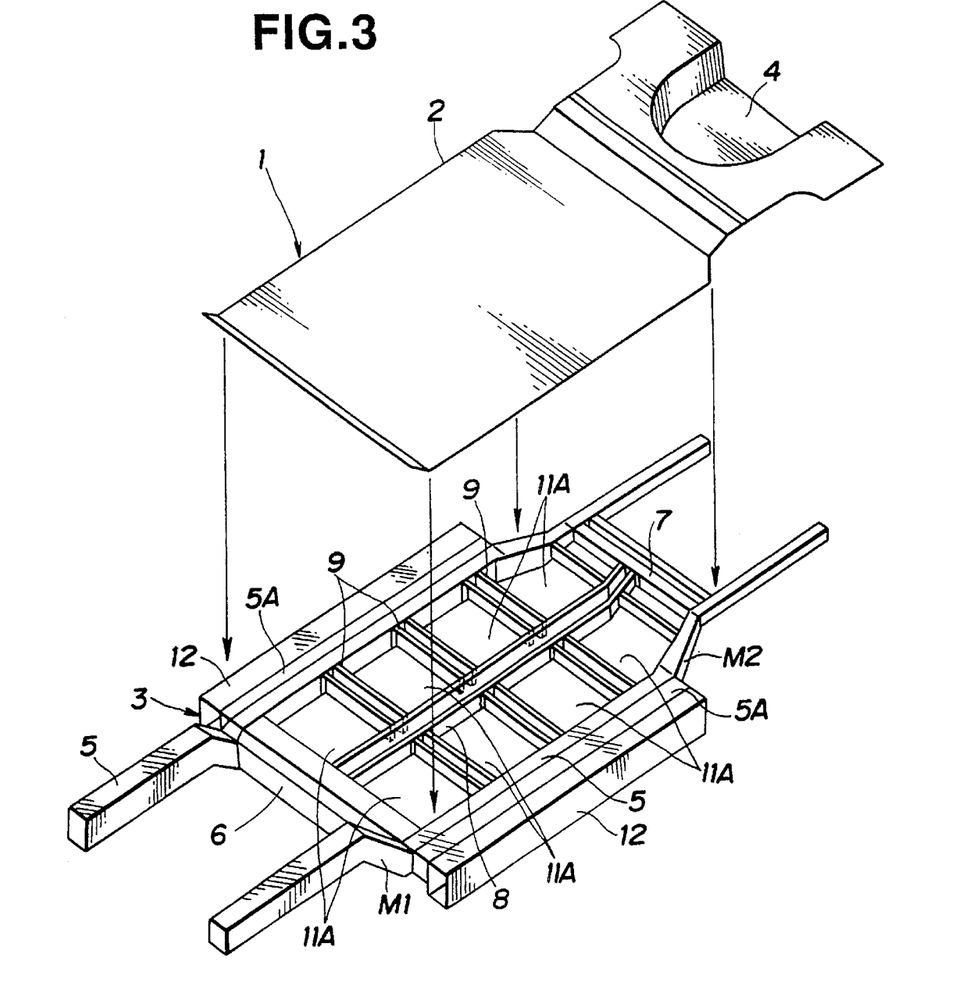
FIG. 3 is an exploded view of an upper unit which constitutes an upper part of the floor structure of the first embodiment.

As is shown in FIG. 3, the upper unit 1 comprises a generally rectangular panel 2 and a ladder-shaped member unit 3 which is secured to a lower surface of the panel 2. Although not shown in the drawings, the rectangular panel 2 is so sized as to extend from a motor room (or engine room) to a trunk room of the vehicle. Designated by numeral 4 is a depression formed in a rear part of the panel 2 for containing a spare tire (not shown).

Also, the member unit 3 is so sized as to extend from the motor room to the trunk room. The member unit 3 comprises two side members 5. The side members 5 are constructed of an extruded hollowed aluminium member having a rectangular cross section.

As is seen from FIG. 2, each side member 5 has front and rear portions which are raised by a certain degree from a major middle portion of the side member 5. That is, when mounted in a vehicle body (not shown), the raised front portion is located in the motor room, the raised rear portion is located in the trunk room, and the major middle portion is located in a passenger cabin of the vehicle. The inclined junction portion between the raised front portion and the middle portion and that between the raised rear portion and the middle portion are designated by references M1 and M2 in the drawing.

Referring back to FIG. 3, the major middle portion of each side member 5 is reinforced by a side sill 12 which is connected thereto through an outrigger 5A. The side sills 12 are constructed of an extruded hollowed aluminium member having a rectangular cross section.

A front cross member 6 extends between rear parts of the raised front portions of the side members 5, and a rear cross member 7 extends between front parts of the raised rear portions of the side members 5, as shown. It is to be noted that the front and rear cross members 6 and 7 are each formed with an inclined lower surface which is attached to an upper surface of the inclined junction portion M1 or M2 of the side member 5.

A center member 8 extends longitudinally from a middle part of the front cross member 6 to that of the rear cross member 7. As is seen from FIG. 1, the center member 8 is of a channel member having upper flanges.

Between each side member 5 and the center member 8, there extend three spaced partition members 9. Each partition member 9 is of a channel member having upper flanges, like the center member 8. As will be understood from FIG. 1, the flanges of the center member 8 and those of the partition members 9 are secured, through welding, bolting or the like, to the lower surface of the panel 2.

Thus, as is seen from FIG. 3, eight rectangular spaces 11A are defined by the two side members 5, the front and rear cross members 6 and 7, the center member 8 and the six partition members 9. Each rectangular space 11A are so sized as to accommodate one battery or two batteries 10.

Figure 5:
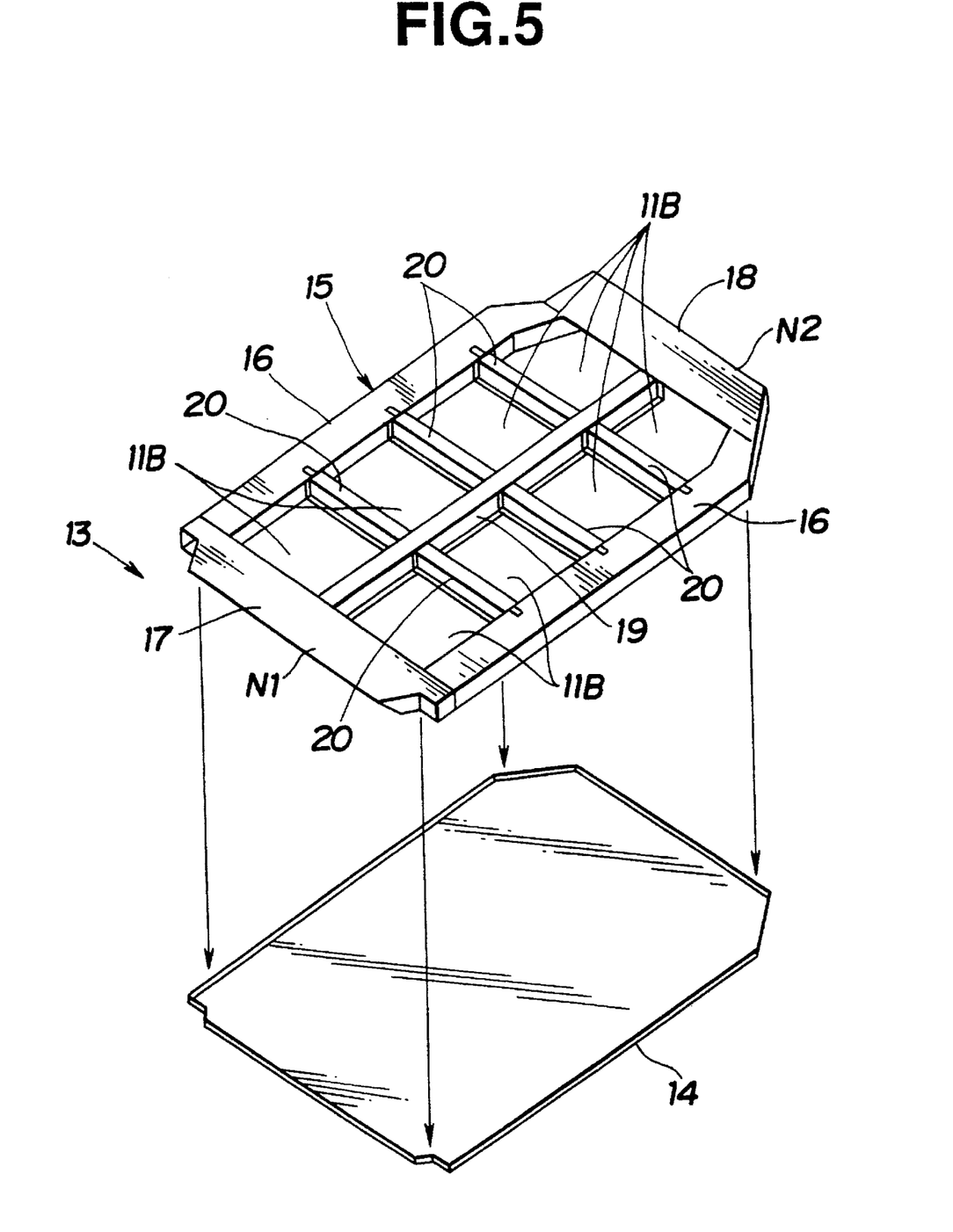
FIG. 5 is an exploded view of a lower unit which constitutes a lower part of the floor structure of the first embodiment.

As is shown in FIG. 5, the lower unit 13 comprises a rectangular panel 14 and a ladder-shaped member unit 15 which is secured to an upper surface of the panel 14. The panel 14 is so sized as to extend from the front cross member 6 to the rear cross member 7 of the above-mentioned upper floor panel 1.

The member unit 15 is sized to match with the panel 14. The member unit 15 comprises two side members 16, and front and rear cross members 17 and 18 which are united to constitute a rectangular frame structure. Similar to the parts of the above-mentioned upper unit, the side members 16 and the front and rear cross members 17 and 18 are constructed of an extruded hollowed aluminium member having a rectangular cross section.

A center member 19 extends from a middle portion of the front cross member 17 to that of the rear cross member 18. As is seen from FIG. 1, the center member 19 is of a channel member having lower flanges.

Between each side member 16 and the center member 19, there extend three spaced partition members 20. Each partition member 20 is of a channel member having lower flanges, like the center member 19. As is seen from FIG. 1, the flanges of the center member 19 and those of the partition members 20 are secured, through welding, bolting or the like, to the upper surface of the panel 14.

Thus, as is seen from FIG. 5, eight rectangular spaces 11B are defined by the two side members 16, the front and rear cross members 17 and 18, the center member 19 and the six partition members 20. These rectangular spaces 11B are sized to match with those 11A of the above-mentioned upper unit 1.

The front and rear cross members 17 and 18 are each formed with an inclined upper surface N1 or N2 which is attached to a lower surface of the above-mentioned inclined junction portion M1 or M2 of the side member 5.

As is seen from FIG. 1, the upper and lower units 1 and 13 are united by means of bolts 21 and nuts 22 in such a manner that the eight rectangular spaces 11A of the upper unit 1 are respectively mated with the eight rectangular spaces 11B of the lower unit 13.

Thus, eight rectangular containers 11 for the batteries 10 are defined or formed in the assembled floor structure 100, as is seen from FIG. 1. It is to be noted that each container 11 has a height larger than that of the battery 10.

Figure 4:
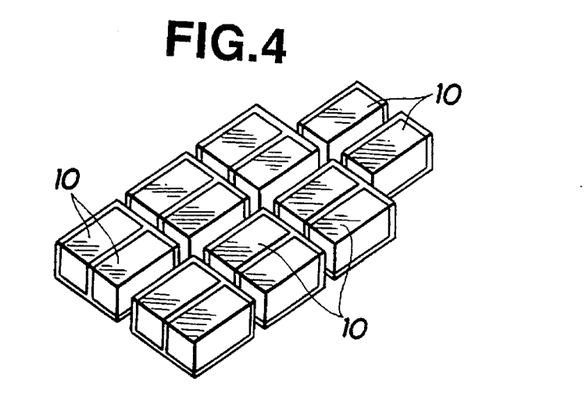
FIG. 4 is a view showing the manner in which batteries are to be mounted on the floor structure of the first embodiment.

As is understood from FIGS. 4 and 3, the rear two of the containers 11 are each sized and constructed to accommodate only one battery 10, while, the remaining six containers 11 are each sized and constructed to accommodate two batteries 10.

Although not shown in the drawings, a known vehicle body structure is incorporated with the floor structure 10.

In order to dismount the batteries 10 from the assembled floor structure 10, the following steps are taken, which will be described in conjunction with FIGS. 1, 3 and 5.

First, a jack (not shown) is applied to one of the side sills 12 to jack up the vehicle. Then, with the lower unit 13 held by a lift tool (not shown), the bolts 21 are loosened and disconnected from the associated nuts 22 for separation of the upper and lower units 1 and 13. Then, the lift tool is operated to lower the lower unit 13 to the ground. With this, all of the batteries 10 on the lower unit 13 become exposed. Under this condition, dismounting of the batteries 10 from the lower unit 13 is easily carried out. After mounting new batteries 10 onto the lowered lower unit 13 and connecting them by the wires, the lower unit 13 is lifted up by the lift tool to the position of the upper unit 1. Then, the two units 1 and 13 are fastened to each other by means of the bolts 21 and nuts 22. Then, the jack is operated to lower the vehicle to the ground.

Thus, the mounting or dismounting of the batteries onto or from the vehicle is easily carried out. Furthermore, since, as is understood from FIG. 2, the upper and lower units 1 and 13 are tightly coupled having their front and rear inclined surfaces M1, M2, N1 and N2 mated, the assembled floor structure 10 can have a sufficient resistance against a head-on and rear-end vehicle collisions. In fact, the assembled floor construction 100 has a so-called double floor construction. Furthermore, providing such inclined surfaces M1, M2, N1 and N2 can facilitate the work for positioning and assembling the lower unit 13 to the upper unit 1. As is understood from FIG. 1, each container 11 is defined by robustly assembled walls and thus, the container 11 can assuredly protect the battery 10 or batteries 10 against the vehicle collision, particularly against a side-on collision. Each container 11 is of an enclosed chamber, and thus even if a liquid spill occurs due to a vehicle collision or the like, the container 11 can hold the liquid.

Referring to FIGS. 6 to 11, there is shown a second embodiment 200 of the present invention.

Figure 11:
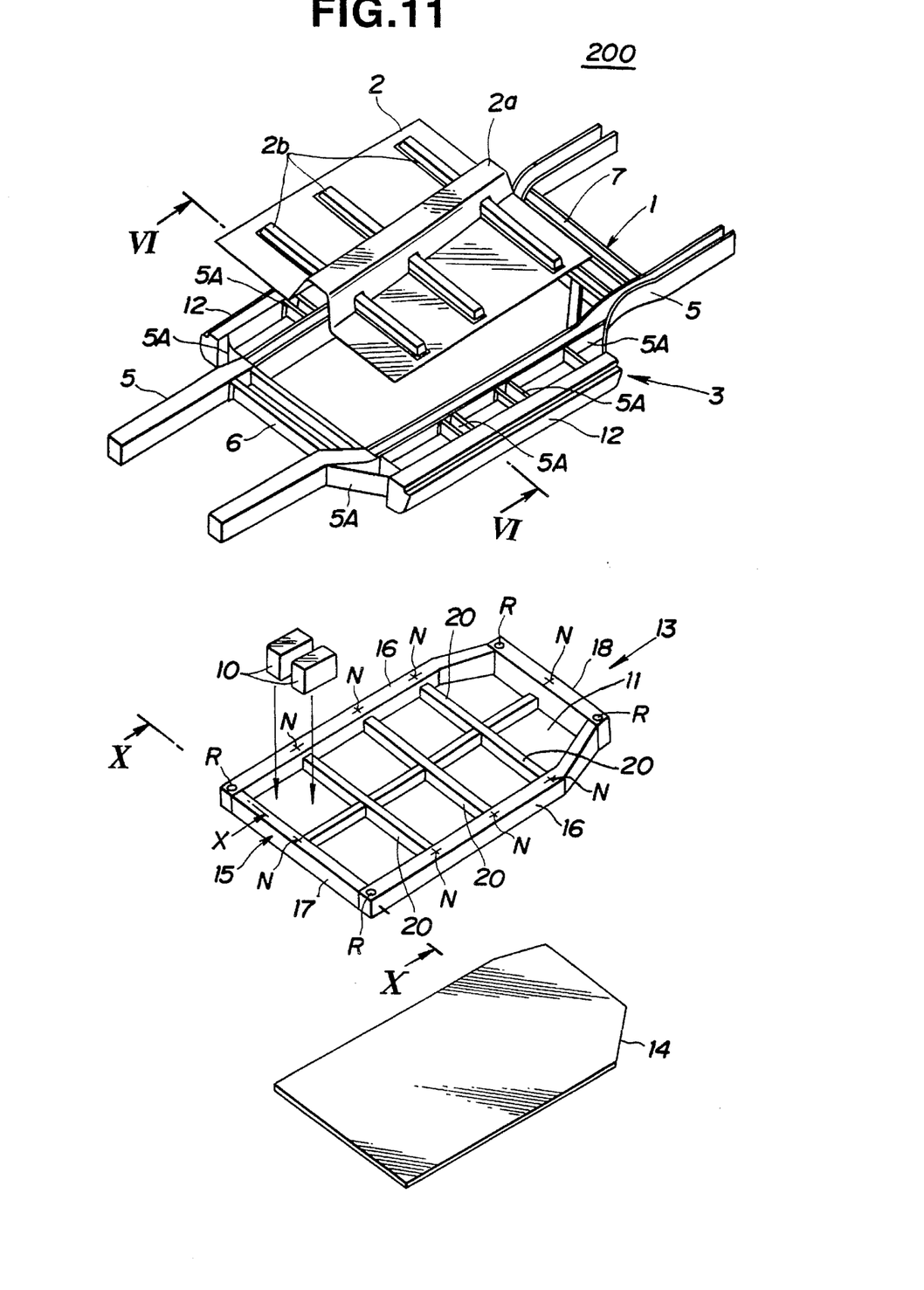
FIG. 11 is an exploded view of the floor structure of the second embodiment of the invention.

As is seen from FIG. 11, the floor structure 200 of the second embodiment comprises generally an upper unit 1 and a lower unit 13 which are united in an after-mentioned manner.

The upper unit 1 comprises a generally rectangular panel 2 and a ladder-shaped member unit 3 which is secured to a lower surface of the panel 2. The panel 2 is formed with a longitudinally extending tunnel 2a, and six reinforcing members 2b are secured to the panel 2 in a manner to extend perpendicular to the tunnel 2a.

Figure 6:
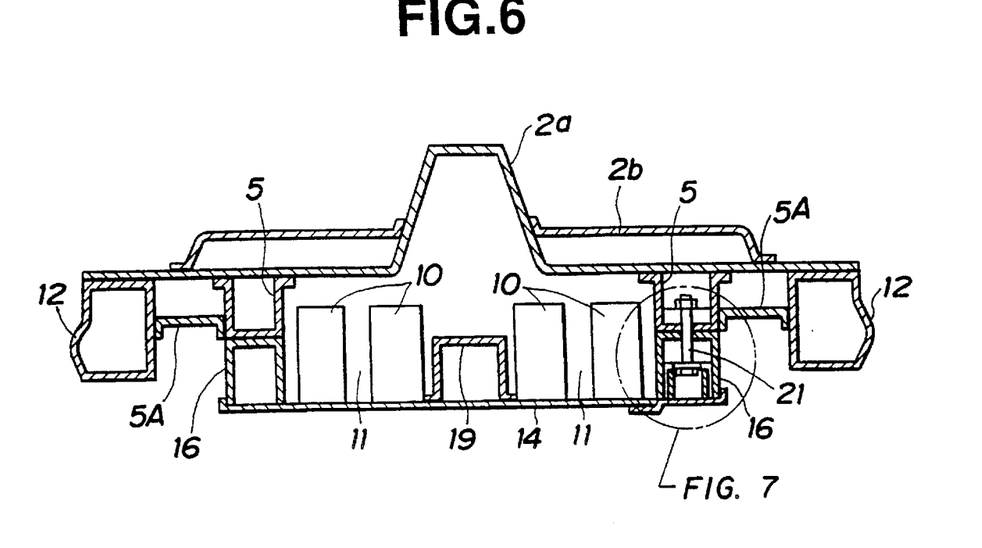
FIG. 6 is a sectional view of a floor structure which is a second embodiment of the present invention, the view being taken along the line VI—VI of FIG. 11.

The member unit 3 comprises two side members 5 which are constructed of aluminium channel member having upper flanges (see FIG. 6).

As is seen from FIG. 11, each side member 5 has front and rear portions which are somewhat raised from a major middle portion of the side member 5. When mounted in a vehicle body (not shown), the raised front portion is located in the motor room, the raised rear portion is located in the trunk room and the major middle portion is located in a passenger room of the vehicle.

The major middle portion of each side member 5 is reinforced by a side sill 12 which is connected thereto through outriggers 5A. The side sills 12 are constructed of an extruded hollowed aluminium member having a rectangular cross section.

A front cross member 6 extends between rear parts of the raised front portions of the side members 5, and a rear cross member 7 extends between front parts of the raised rear portions of the side members 5, as shown. The front and rear cross members 6 an 7 are each constructed of an aluminium channel member having upper flanges.

As is seen from FIG. 6, the member unit 3 is secured to the lower surface of the panel 2. That is, the upper flanges of the side members 5, those of the front and rear cross members 6 and 7 and the upper surfaces of the side sills 12 are secured to the lower surface of the panel 2 through welding, bolting or the like.

Referring back to FIG. 11, the lower unit 13 comprises a panel 14 and a ladder-shaped member unit 15 which is secured to an upper surface of the panel 14.

The member unit 15 is sized to match with the panel 14 and comprises two side members 16, and front and rear cross members 17 and 18 which are united to constitute a rectangular frame structure. The side members 16 and front and rear cross members 17 and 18 are each constructed of an aluminium hollowed member having a rectangular cross section.

A center member 19 extends from a middle portion of the front cross member 17 to that of the rear cross member 18.

Between each side member 16 and the center member 19, there extend three spaced partition members 20. As is seen from FIG. 6, the center member 19 and the partition members 20 are each constructed of an aluminium channel member having lower flanges. The flanges of the center member 19 and those of the partition members 20 are secured, through welding, bolting or the like, to the upper surface of the panel 14.

Thus, as is seen from FIG. 11, eight rectangular spaces 11 are defined by the two side members 16, the front and rear cross members 17 and 18, the center member 19 and the partition members 20. Similar to the above-mentioned first embodiment, the rear two of the rectangular spaces 11 are each sized constructed to accommodate only one battery 10, while, the remaining six spaces 11 are each side and constructed to accommodate two batteries 10.

As is seen from FIG. 6, the upper and lower units 1 and 13 are coupled by means of bolts 21 and nuts 22 in such a manner as will be described in the following.

That is, in order to couple the upper and lower units 1 and 13, first and second types of connecting structures are employed in this second embodiment.

Figure 8:
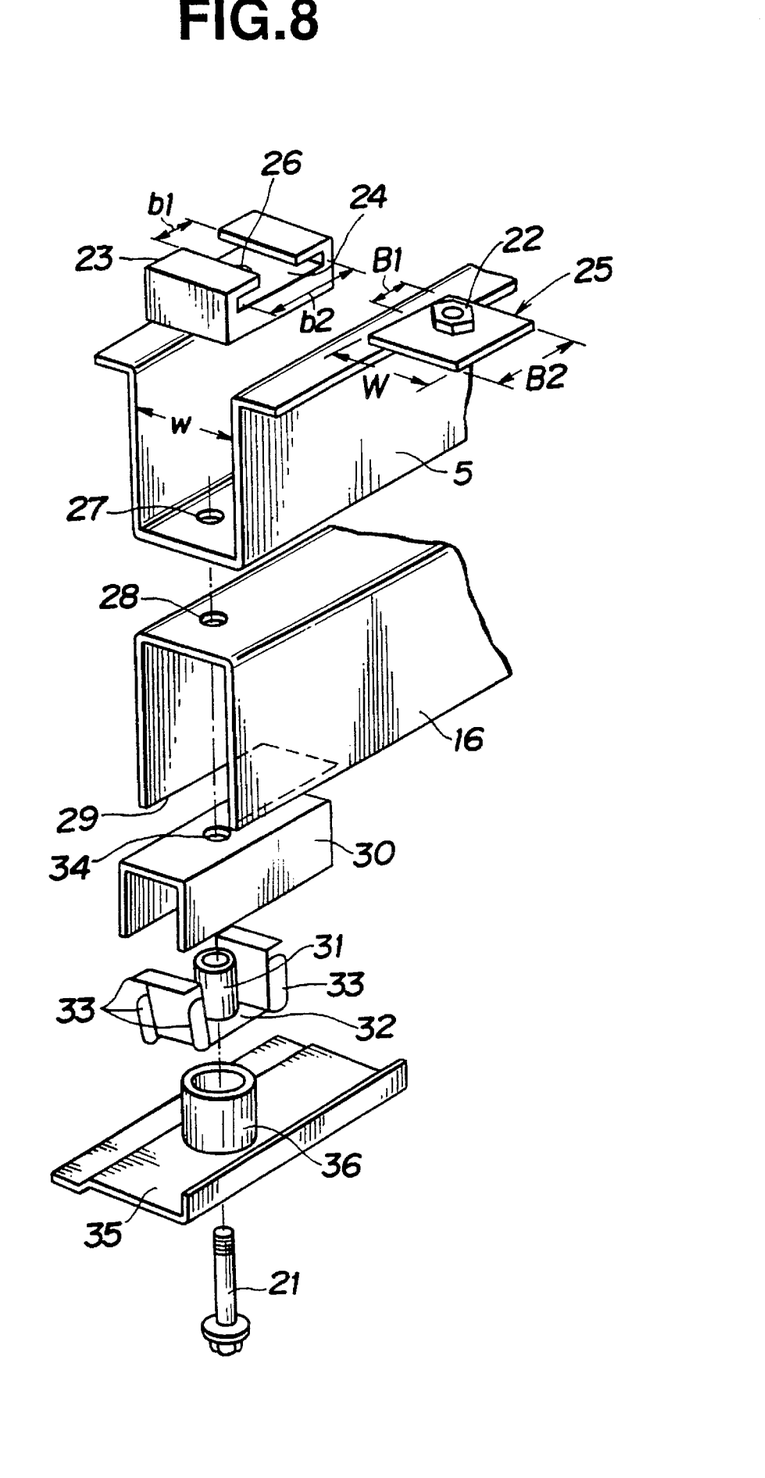
FIG. 8 is an exploded view of an essential portion of the floor structure of the second embodiment.
Figure 9:
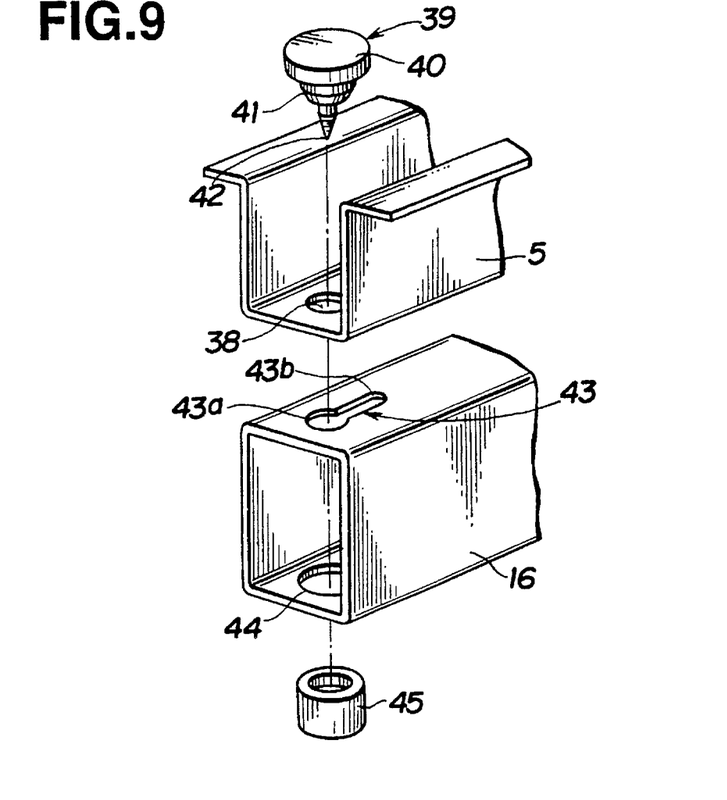
FIG. 9 is an exploded view of another essential portion of the floor structure of the second embodiment.
Figure 10:
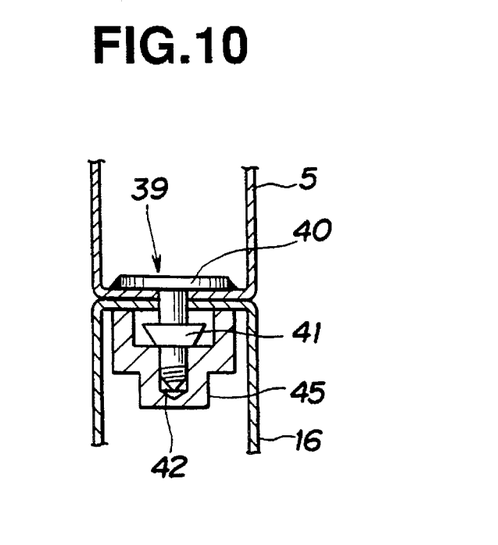
FIG. 10 is a sectional view taken along the line X—X of FIG. 11.

The first type is shown in FIG. 8, which is used for connecting the major portions "N" (see FIG. 11) of the lower unit 13 to corresponding portions of the upper unit 1, and the second type is shown in FIGS. 9 and 10, which is used for connecting the corner portions "R" of the lower unit 13 to the corresponding portions of the upper unit 1.

Figure 7:
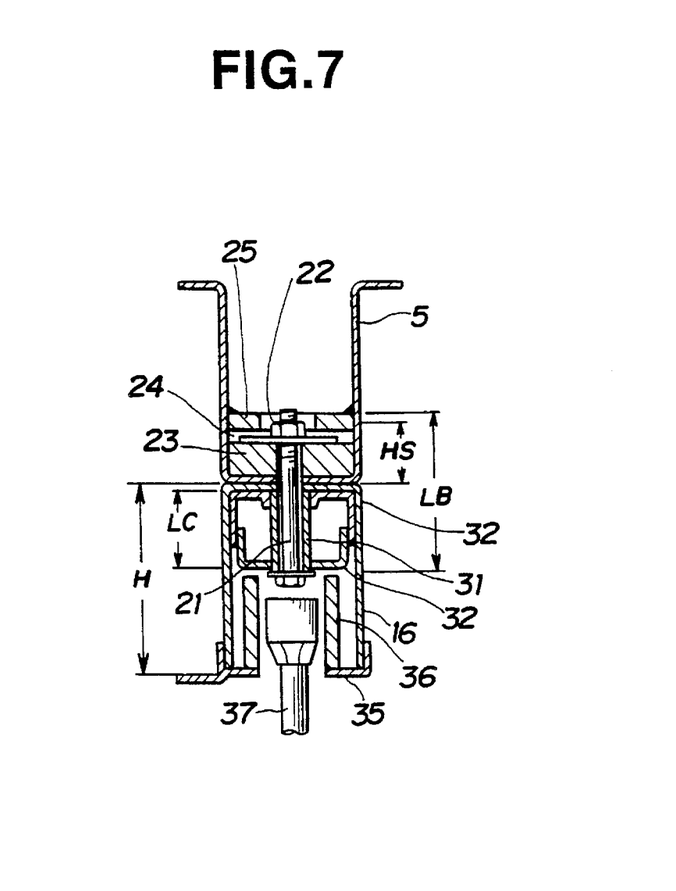
FIG. 7 is an enlarged view of the portion enclosed by a circle "VII" of FIG. 6.

First, the connecting structure of the first type shown in FIG. 8 will be described in detail with reference to FIGS. 6, 7 and 8.

As is seen from FIG. 8, a rectangular retainer 23 of aluminium is formed with both a bolt opening 26 and a rectangular slit 24 in which a rectangular nut plate 25 is movably received. The diameter of the bolt opening 26 is slightly larger than that of the bolt 21. The slit 24 has a window (no numeral) through which the nut 22 welded to the nut plate 25 is exposed to the outside. With the nut plate 25 kept therein, the retainer 23 is received in the bottom of the channel-shaped side member 5 and welded to side walls of the same. The bottom of the side member 5 is formed with a bolt opening 27 whose diameter is slightly larger than that of the bolt 21. The width "b1" of window of the slit 24 is greater than the diameter "B1" of the nut 22, the width "b2" of the slit 24 is greater than the width "B2" of the nut plate 25 and the width "w" of the channel of the side member 5 is greater than the length "W" of the nut plate 25. Thus, the nut plate 25 can move in the slit 24 in various radial directions but slightly.

The hollowed side member 16 of the lower unit 13 is formed at its upper wall with a bolt opening 28 whose diameter is slightly larger than that of the bolt 21. The side member 16 is further formed at its lower wall with a rectangular cut 29. Within the side member 16, there is provided a reinforcing structure which comprises a channel piece 30 welded to an upper wall of the channel piece 30 and a steel collar 31 connected to the channel piece 30 through a holder member 32. That is, the holder member 32 comprises a bottom wall onto which the steel collar 31 is welded and two side walls which have flanges 33 welded to the channel piece 30. The channel piece 30 is formed with a bolt opening 34 and the bottom wall of the holder member 32 is formed with a bolt opening (not shown) which is concentric with the cylindrical bore of the steel collar 31.

Designated by numeral 35 is a cover plate which is welded to the lower wall of the side member 16 to cover the cut 29 of the side member 16. Although not shown in the drawing, the cover plate 35 is formed with an opening which is larger than the head of the bolt 21. A guide collar 36 is welded to the cover plate 35 in a manner to be concentric with the larger opening.

As will be seen from FIG. 6, when the upper and lower units 1 and 13 are rightly positioned, the nut 22, the opening 27 of the upper side member 5, the opening 28 of the lower side member 16, the opening 34 of the channel piece 30, the steel collar 31 and the guide collar 36 are aligned. Thus, under this condition, with usage of a manipulating tool 37 led into the guide collar 36, the bolt 21 can be inserted through the aligned openings into the nut 22. When the bolt 21 is turned in a given direction by the tool 37, the upper and lower side members 5 and 16 are tightly connected.

It is now to be noted that due to the movable engagement of the nut plate 25 with the retainer 23 (see FIG. 8), the relative positioning between the upper and lower units 1 and 13 can be adjusted within a range determined by the moved distance of the nut plate 25.

In the following, the connecting structure of the second type shown in FIGS. 9 and 10 will be described in detail with reference to the drawings. As is mentioned hereinabove, this type connecting structure is used for connecting the corner portions "R" of the lower unit 13 to the corresponding portions of the upper unit 1.

As is seen from the drawings, the side member 5 of the upper unit 1 is formed at its bottom wall with an opening 38. A locating bolt 39 is welded at its head portion 40 to the bottom wall having its conical hook portion 41 projected outward through the opening 38. The bolt 39 has a threaded end 42. The side member 16 of the lower unit 13 is formed at its upper wall with an engaging aperture 43 which includes a circular opening 43a and an elongate opening 43b. The diameter of the circular opening 43a is greater than that of the conical hook portion 41 of the locating bolt 39, while the width of the elongate opening 43b is smaller than the diameter of the hook portion 41. The side member 16 is further formed at its lower wall with a circular opening 44 which is sized to accommodate a nut 45.

As will be understood from FIGS. 9 and 10, when the upper and lower side members 5 and 16 are brought to their right positions, the conical hook portion 41 of the locating bolt 39 of the upper side member 5 is projected through the circular opening 43a of the engaging aperture 43 of the lower side member 16. When the lower unit 13 is then pushed forward, that is, leftward in FIG. 9, the same is moved in the same direction causing the locating bolt 39 to move backward in and along the elongate opening 43b of the aperture 43. Thus, thereafter, the lower side member 16 can be held by the upper side member 5 engaging the conical hook portion 41 of the locating bolt 39 with the elongate opening 43b. Then, with usage of a manipulating tool (not shown), the nut 45 is inserted into the lower side member 16 through the larger circular opening 44 and engaged with the threaded end 42 of the locating bolt 39. When the nut 45 is turned and tightened by the tool, the upper and lower side members 5 and 16 are tightly connected.

In order to mount batteries 10 to the associated electric vehicle, the following steps are taken, which will be commenced with respect to FIG. 11.

First, the batteries 10 are loaded onto the lower unit 13 which is left on the ground. After connecting the batteries in series by the wires, the lower unit 13 is lifted up by a lift tool (not shown) to the position where the conical hook portions 41 of the locating bolts 39 (see FIG. 9) are inserted into the engaging apertures 43 of the lower side members 5. Because of the conical shape of the hook portion 41 of each locating bolt 39, insertion of the bolt 39 into the circular opening 43a of the aperture 43 is easily made. Then, the lower unit 13 is pushed forward, that is, leftward in FIG. 11, the same is moved in the same direction causing the locating bolts 39 to move backward in and along the elongate openings 43b of the associated engaging apertures 43. Thus, under this condition, the lower unit 13 is held by the upper unit 1 for the reason which has been described hereinabove. The pushing of the lower unit 13 is so made as to establish the alignment of the other openings 27 and 28 (see FIG. 8) of the upper and lower side members 5 and 16. Then, with an aid of the manipulating tool, the nuts 45 are engaged with the threaded ends 42 of the locating bolts 39.

Then, with aid of the manipulating tool 37 (see FIG. 7), the bolts 21 are inserted through the aligned openings into the nuts 22 and turned in a given direction.

With these, the lower unit 13 is tightly and rightly fixed to the upper unit 1 to assemble the floor structure 200. Because, as has mentioned hereinafore, the nut plate 25 is movably held by the retainer 23, the meshed engagement of each bolt 21 with the nut 22 is made with ease. Dismounting of the batteries 10 from the vehicle is easily carried out by taking reversed steps.

As is described hereinabove, in the second embodiment 200, the assembly of the upper and lower units 1 and 13 is easily achieved because of employment of the two types of connecting structures.

Referring to FIGS. 12 to 18, there is shown a third embodiment 300 of the present invention. As will become apparent as the description proceeds, in the third embodiment, there is further employed a measure for keeping the temperature of all the batteries at a given range, for example, from 30° C. to 50° C. As is known, batteries can exhibit their maximum performance when maintained at such temperature.

Similar to the above-mentioned first embodiment 100, the floor structure 300 of the third embodiment is constructed to have a so-called double floor structure.

Figure 13:
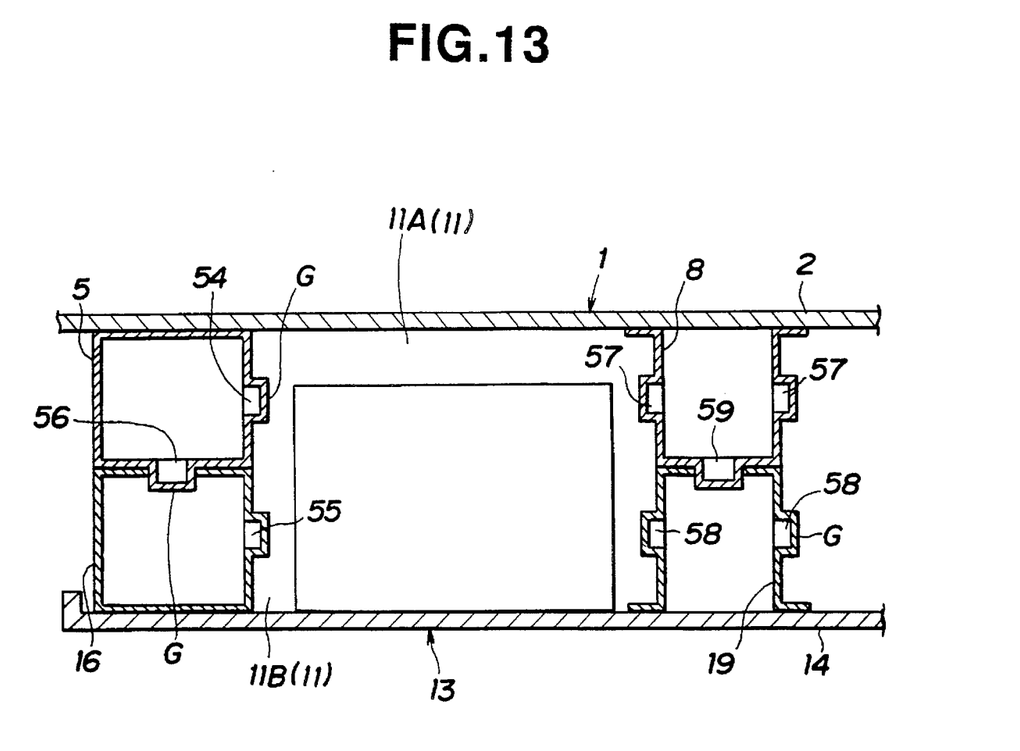
FIG. 13 is a sectional view of an essential portion of the floor structure of the third embodiment, the view being an enlarged view of a part of FIG. 17.
Figure 17:
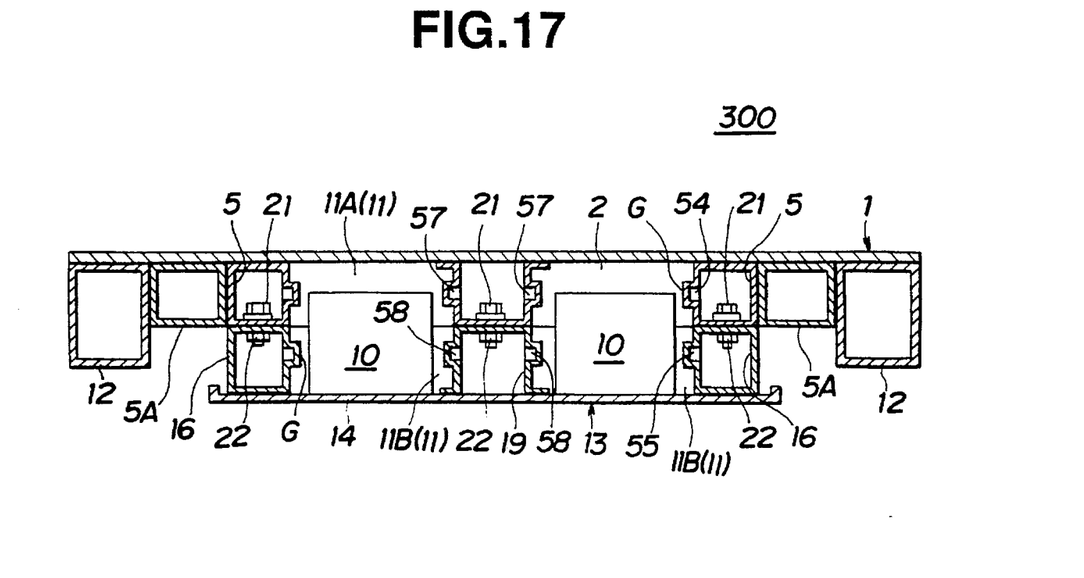
FIG. 17 is a sectional view of the floor structure of the second embodiment, the view being taken along the line XVII—XVII of FIG. 18.
Figure 18:
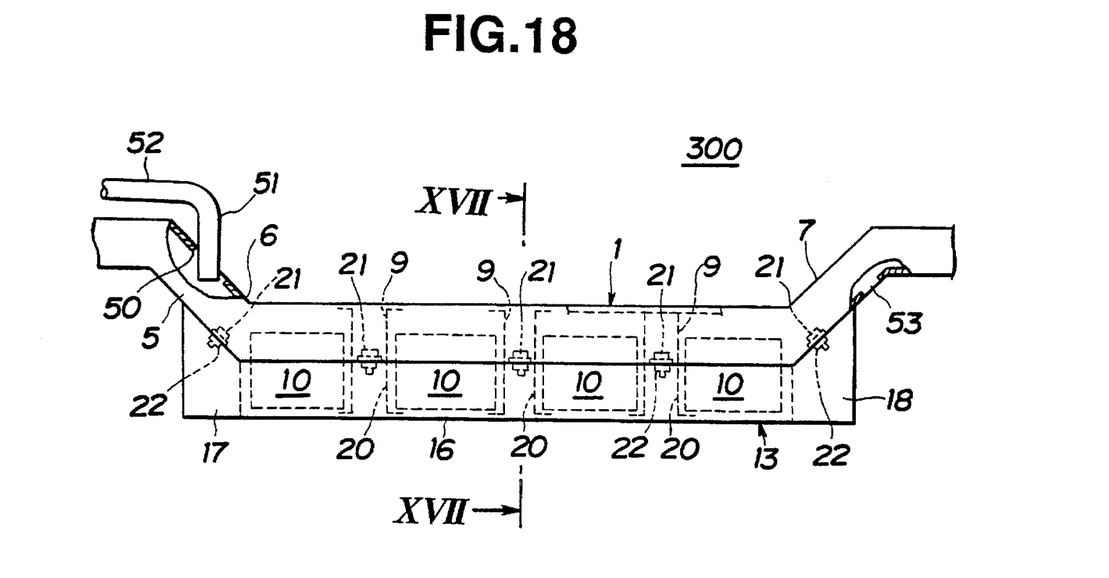
FIG. 18 is a side view of the floor structure of the third embodiment.

That is, as is seen from FIGS. 13, 17 and 18, the floor structure 300 comprises generally an upper unit 1 and a lower unit 13 which are united to constitute the double floor structure.

Figure 12:
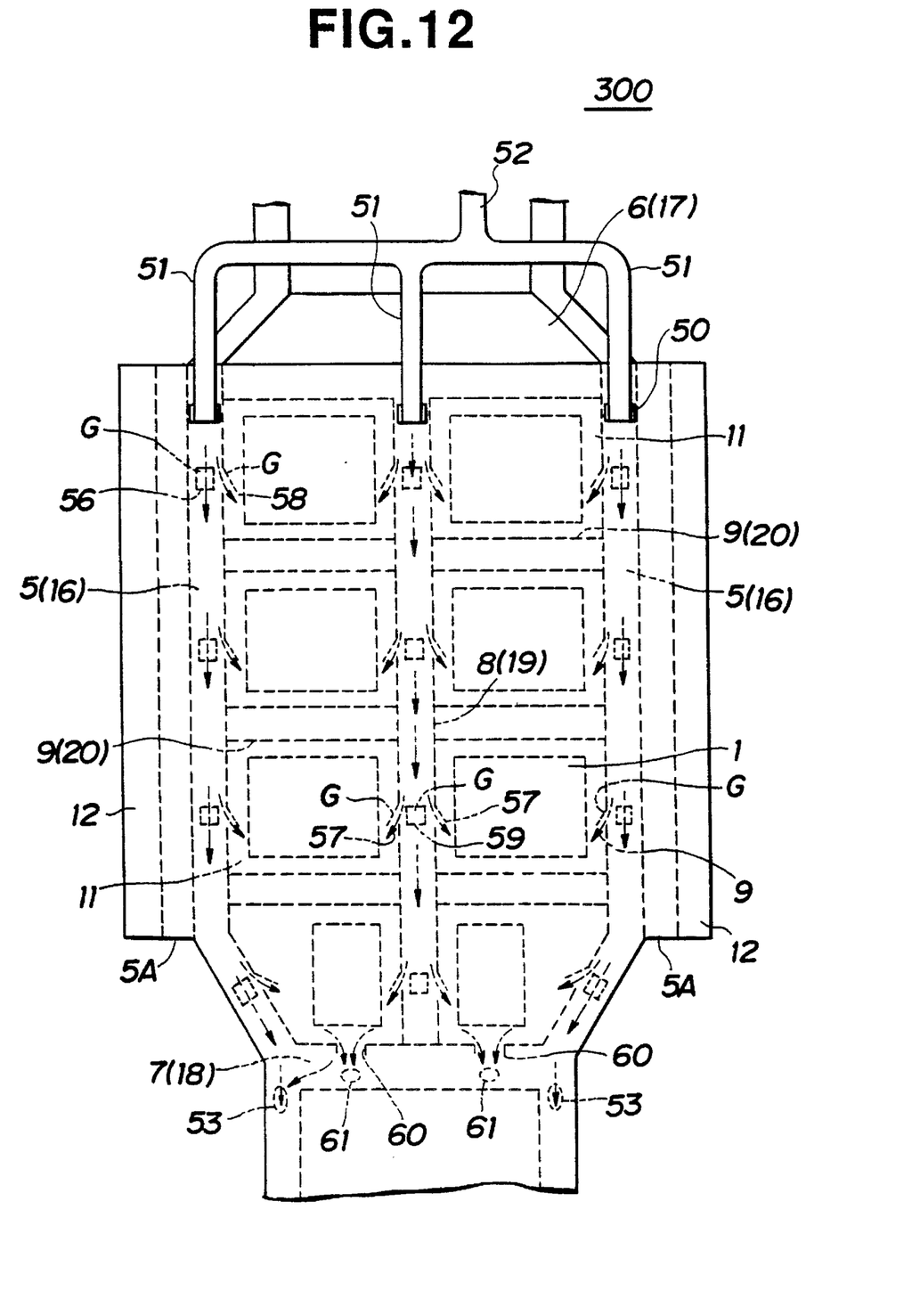
FIG. 12 is a plan view of a floor structure which is a third embodiment of the present invention.

As is understood from FIGS. 12 and 17, the upper unit 1 comprises a generally rectangular panel 2. Two hollow side members 5 are secured to lateral ends of the panel 2 and extend along the longitudinal axis of the same. As shown, each side member 5 has a rectangular cross section. As seen from FIG. 18, front and cross members 6 and 7 extend laterally along front and rear ends of the panel 2 respectively. As is seen from FIG. 12, side sills 12 are connected through outriggers 5A to the side members 5 respectively. Similar to the first embodiment 100, each side member 5 has front and rear portions which are somewhat raised from a major middle portion of the side member 5.

As is seen from FIG. 17, a center member 8 extends longitudinally from a middle part of the front cross member 6 to that of the rear cross member 7. The center member 8 is of a channel member having upper flanges secured to the panel 2.

Between ease side member 5 and the center member 8, there extend three spaced partition members 9. Each partition member 9 is of a channel member having upper flanges secured to the panel 2.

Thus, as is seen from FIG. 12, eight rectangular spaces 11A are defined by the two side members 5, the front and rear cross members 6 and 7, the center member 8 and the six partition members 9. Each rectangular space 11A are so sized as to accommodate one or two batteries 10.

As is shown in FIG. 17, the lower unit 13 comprises a rectangular panel 14. Two hollow side members 16 are secured to lateral ends of the panel 14 respectively and extend along the longitudinal axis of the panel 14. Front and rear cross members 17 and 18 extend laterally along front and rear ends of the panel 14. The side members 16 and the front and rear cross members 17 and 18 are constructed of an extruded hollowed aluminium member having a rectangular cross section.

A center member 19 extends from a middle portion of the front cross member 17 to that of the rear cross member 18. The center member 19 is of a channel member having lower flanges secured to the panel 14.

Between each side member 16 and the center member 19, there extend three spaced partition members 20. Each partition member 20 is of a channel member having lower flanges secured to the panel 14.

Thus, eight rectangular spaces 11B are defined by the two side members 16, the front and rear cross members 17 and 18, the center member 19 and the six partition members 20. These rectangular spaces 11B are sized to match with those 11A of the above-mentioned upper unit 1.

As is seen from FIGS. 17 and 18, the upper and lower units 1 and 13 are united by means of bolts 21 and nuts 22 in such a manner that the eight rectangular spaces 11A of the upper unit 1 are respectively mated with the eight rectangular spaces 11B of the lower unit 13.

Thus, eight rectangular containers 11 for the batteries 10 are defined or formed n the assembled floor structure 300, as is seen from FIG. 12. The rear two of the containers 11 are each sized and constructed to accommodate only one battery 10, while, the remaining six containers 11 are each sized and constructed to accommodate two batteries 10.

In the following, the measure for keeping the temperature of the batteries 10 at a given range will be described with reference to the drawings.

As is seen from FIGS. 12 and 18, the upper panel 2 is formed at its front portion with three inlet ports 50 which are exposed to the interiors of the side members 5 and the center member 8. From the inlet ports 50, there extend three tubes 51 which are united into one tube 52. The tube 52 extends to a known air conditioner (not shown).

As is seen from FIG. 18, each side member 5 has at the raised rear portion an outlet port 53 which faces downward.

Figure 14:
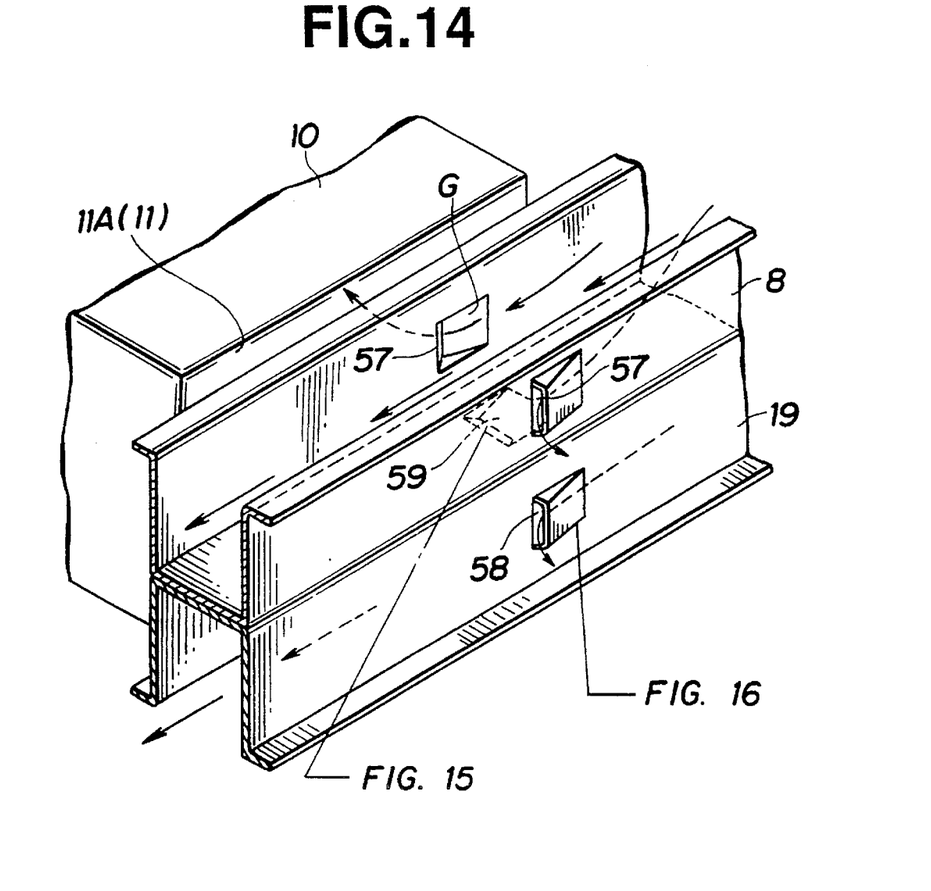
FIG. 14 is an enlarged perspective view of the essential portion of the floor structure of the third embodiment.

As is seen from FIGS. 13, and 14, the side members 5 and 16 of the upper and lower units 1 and 13 are formed at their inside walls with openings 54 and 55 through which the interiors of the side members 5 and 16 are communicated with the interiors of the containers 11. In addition, the side members 5 and 16 are formed at their mated walls with openings 56 through which the interiors of them are communicated. The center members 8 and 19 of the upper and lower units 1 and 13 are formed at their both side walls with openings 57 and 58 through which the interiors of the center members 8 and 19 are communicated with the interiors of all the eight containers 11. In addition, the center members 8 and 19 are formed at their mated walls with openings 59 through which the interiors of them are communicated.

Figure 15:
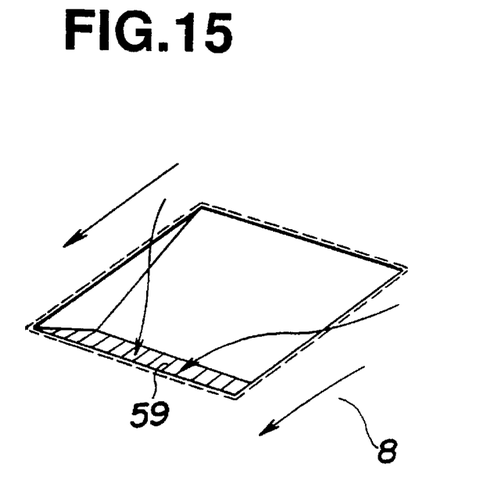
FIG. 15 is an enlarged view of the portion indicated by an arrow "XV" of FIG. 14.
Figure 16:
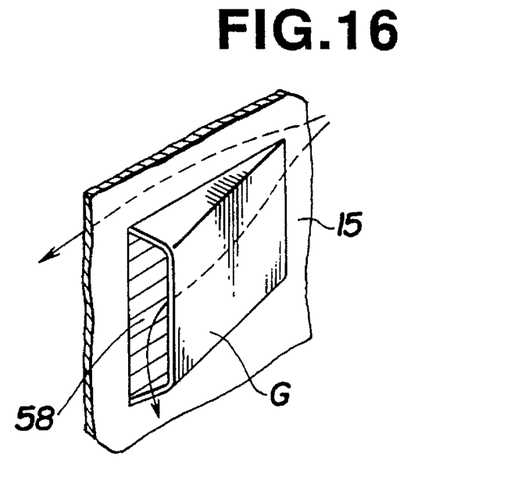
FIG. 16 is an enlarged view of the portion indicated by an arrow "XVI" of FIG. 14.

As is understood from FIGS. 14, 15 and 16, each opening 54, 55, 56, 57, 58 or 59 is formed by pressing out of the side or center member 5, 16, 8 or 19. Thus, each opening has a tapered air guide wall "G".

It is to be noted that the sizes of the openings 54, 55, 56, 57, 58 and 59 gradually increase as the distance from the air inlet ports 50 increases. With this, the amounts of air fed to the containers 11 are equalized.

The rear two of the containers 11 have each an outlet opening 60 which is connected to the outlet ports 53 through the interior of the rear cross member 7. For this connection, the rear cross member 7 is formed with openings 61.

Under operation of the air conditioner, the conditioned air is fed to the battery containers 11 through the tubes 52 and 51, the side members 5 and 16, the center members 8 and 19 and the various openings 54, 55, 56, 57, 58 and 59. Because, as is mentioned hereinabove, the sizes of the openings gradually increase with increase of distance from the inlet ports 50, the air feed to the containers 11 is substantially equalized. Thus, the containers 11 and thus the batteries 10 contained therein are maintained at the desired temperature. Due to the air flow, effective ventilation of the containers 11 is also achieved.

If desired, in place of the air conditioner, a known air blower may be connected to the tube 52. In this case, surrounding air is fed to the containers 11.

What is claimed is:

1. A floor structure of an electric motor vehicle powered by batteries mounted thereon, comprising:

an upper unit including a first panel and a first base structure, said first panel being a floor panel of said vehicle, said first base structure being mounted on a lower surface of said first panel and including laterally extending front and rear cross members and two longitudinally extending side members by which members a first given space facing downward is defined;

a lower unit including a second panel and a second base structure, said second base structure being mounted on an upper surface of said second panel to define a second given space which faces upward, said first base structure of the upper unit being mounted on said second base structure of the lower unit such that said first and second given spaces face each other and are merged with each other;

partition means for dividing the second given space of said lower unit into a plurality of container spaces, each container space being sized to contain therein at least one of said batteries; and connecting means for detachably connecting the first base structure of said upper unit with the second base structure of said lower unit thereby to merge said first and second given spaces.

2. A floor structure as claimed in claim 1, in which each of said first and second base structures has a generally rectangular frame which comprises:

said two side members which extend in parallel with each other;

said front cross member which extends between front ends of said two side members; and said rear cross member which extends between rear ends of said two side members.

3. A floor structure as claimed in claim 2, in which said partition means comprises:

a center member extending between the front and rear cross members of said second base structure; and a plurality of spaced partition members which extend laterally between each of the side members of said second base structure and said center member.

4. A floor structure as claimed in claim 3, in which said first base structure further comprises:

outriggers respectively connected to the side members; and side sills respectively connected to said outriggers.

5. A floor structure as claimed in claim 4, in which each of the side members of the first base structure has front and rear portions which are raised by a given degree from a major middle portion of the side member.

6. A floor structure as claimed in claim 5, in which said first panel is formed with a longitudinally extending tunnel and provided with a plurality of laterally extending reinforcing members, each reinforcing member extending perpendicular to said tunnel.

7. A floor structure as claimed in claim 5, in which the front and rear cross members of said first base structure have inclined lower surfaces and in which the front and rear cross members of said second base structure have inclined upper surfaces, said inclined lower surfaces being mated with the inclined upper surfaces respectively.

8. A floor structure as claimed in claim 5, in which said connecting means comprises:

a plurality of bolts, a first group of bolts passing through bolt openings formed in the side members of said first base structure and bolt openings formed in the side members of said second base structure, and a second group of bolts passing through openings formed in the center members of said first base structure and bolt openings formed in the center member of said second base structure; and a plurality of nuts operatively engaged with said bolts.

9. A floor structure as claimed in claim 6, in which said connection means comprises:

a first connecting structure which detachably connect given portions of the first base structure to given portions of the second base structure; and a second of connecting structure which detachably connects to corner portions of the first base structure to corner portions of the second base structure.

10. A floor structure as claimed in claim 9, in which each of said first connecting structure comprises:

a retainer securely held by the side member of said first base structure, said retainer being formed with a bolt opening, a slit and a window which is merged with said slit;

a nut plate movably received in said slit;

means defining in the side member of the first base structure a bolt opening which is mated with the bolt opening of said retainer;

means defining a bolt opening in the side member of the second base structure;

a channel piece secured to the side member of the second base structure, said channel piece having a bolt opening which is mated with the bolt opening of the side member of the second base structure;

a steel collar;

a holder member secured to said channel member to connect the steel collar to the channel member, the steel collar having a cylindrical bore concentric with the bolt opening of said channel piece; and a bolt, said bolt passing through the steel collar, the bolt opening of the channel piece, the bolt opening of the side member of the second base structure, the bolt opening of the first base structure and the bolt opening of the retainer and engaged with the nut plate.

11. A floor structure as claimed in claim 10, in which each said first connecting structure further comprises:

a cover plate having a larger opening, said cover plate being secured to the side member of the second base structure to cover a cut part of the same, said larger opening being concentrically aligned with the cylindrical bore of said steel collar; and a guide collar secured to said cover plate to be concentric with said larger opening, said guide collar being disposed between said cover member and said holder member.

12. A floor structure as claimed in claim 10, in which each said second connecting structure comprises:

means defining in the side member of said first base structure a bolt opening;

a locating bolt including a head portion, a conical hook portion and a threaded end portion, said bolt being secured to said side member having said conical hook portion and said threaded end projected outward through said bolt opening;

means defining in one wall of the side member of said second base structure an engaging aperture, said engaging aperture including a circular opening and an elongate opening which are connected, the diameter of the circular opening being greater than that of the conical hook portion, the width of said elongate opening being smaller than the diameter of said hook portion;

means defining in another wall of the side member of said second base structure a larger opening; and a nut engaged with the threaded end portion of said locating bolt.

13. A floor structure as claimed in claim 5, in which the side members and the center members of said first and second base structures are each constructed of a hollow member having a generally rectangular cross section.

14. A floor structure as claimed in claim 13 further comprising:

means for providing a communication between the interior of each side member of the first base structure and the rectangular containers;

means for providing a communication between the interior of each side member of the second base structure and the rectangular containers;

means for providing a communication between the interior of each side member of the first base structure and the interior of the corresponding side member of the second base structure;

means for providing a communication between the interior of the center member of the first base structure and the rectangular containers;

means for providing a communication between the interior of the center member of the second base structure and the rectangular containers;

means for providing a communication between the interiors of the center members of the first and second base structures;

means defining air inlet openings in upstream portions of said side members and the center member of said first base structure, said air inlet openings being adapted to connect with an air conditioner; and means defining air outlet openings in downstream portions of said side members and the center member of said second base structure.

15. A floor structure as claimed in claim 14, in which said means for providing the communication are openings.

16. A floor structure as claimed in claim 15, in which each of said openings has a tapered air guide wall.

* * * * *